(12) United States Patent
Mori et al.

(10) Patent No.: US 9,081,406 B2
(45) Date of Patent: Jul. 14, 2015

(54) STATIC VAR COMPENSATOR INCLUDING SERIES CIRCUITS OF THREE PHASES THAT ARE DELTA-CONNECTED TO THREE-PHASE AC BUSES

(71) Applicants: Osamu Mori, Chiyoda-ku (JP); Masatoshi Takeda, Osaka (JP); Shinichi Ogusa, Chiyoda-ku (JP)

(72) Inventors: Osamu Mori, Chiyoda-ku (JP); Masatoshi Takeda, Osaka (JP); Shinichi Ogusa, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 204 days.

(21) Appl. No.: 13/706,446

(22) Filed: Dec. 6, 2012

(65) Prior Publication Data
US 2014/0009127 A1 Jan. 9, 2014

(30) Foreign Application Priority Data
Jul. 9, 2012 (JP) ................................. 2012-153550

(51) Int. Cl.
*G05F 1/70* (2006.01)
*H02M 1/42* (2007.01)

(52) U.S. Cl.
CPC ............... *G05F 1/70* (2013.01); *H02M 1/4208* (2013.01); *Y02E 40/30* (2013.01)

(58) Field of Classification Search
CPC ............................... G05F 1/70; H02M 1/4208
USPC .................................................. 323/205–211
See application file for complete search history.

(56) References Cited

U.S. PATENT DOCUMENTS

| | | | | |
|---|---|---|---|---|
| 4,275,346 A | * | 6/1981 | Kelley, Jr. | 323/210 |
| 4,302,715 A | * | 11/1981 | Putman et al. | 323/210 |
| 4,353,024 A | * | 10/1982 | Gyugyi | 323/211 |
| 4,451,777 A | * | 5/1984 | Gyugyi | 323/210 |
| 4,513,240 A | * | 4/1985 | Putman | 323/210 |
| 4,555,659 A | * | 11/1985 | Gyugyi | 323/210 |
| 4,686,447 A | * | 8/1987 | Takeda et al. | 323/210 |
| 4,719,402 A | * | 1/1988 | Brennen et al. | 323/211 |
| 4,797,587 A | * | 1/1989 | Tschudi et al. | 327/461 |
| 4,811,236 A | * | 3/1989 | Brennen et al. | 702/64 |
| 4,891,570 A | * | 1/1990 | Nakamura et al. | 323/210 |
| 5,121,048 A | * | 6/1992 | Larsen | 323/210 |

(Continued)

FOREIGN PATENT DOCUMENTS

| | | |
|---|---|---|
| JP | 61-168411 U | 10/1986 |
| JP | 62-244268 A | 10/1987 |

(Continued)

*Primary Examiner* — Fred E Finch, III
*Assistant Examiner* — Yusef Ahmed
(74) *Attorney, Agent, or Firm* — Buchanan Ingersoll & Rooney PC

(57) ABSTRACT

Three-phase thyristor switched capacitors are delta-connected to three-phase AC buses. Each thyristor switched capacitor includes a reactor, a capacitor, and a thyristor switch that are electrically connected in series. The thyristor switches of the three phases are arranged so that the terminal-to-terminal distance between respective thyristor switches of respective phases are not uniform. The three-phase thyristor switched capacitors are configured so that the thyristor switched capacitors of two of the three phases having a shortest terminal-to-terminal distance therebetween are opposite to each other in terms of connection order in which the thyristor switch and the capacitor are electrically connected along a loop path made up of the delta-connected thyristor switched capacitors.

14 Claims, 9 Drawing Sheets

(56) References Cited

U.S. PATENT DOCUMENTS

| | | | |
|---|---|---|---|
| 5,570,007 A * | 10/1996 | Larsen | 323/209 |
| 6,107,785 A * | 8/2000 | Griffiths | 323/209 |
| 6,246,218 B1 * | 6/2001 | Tambe | 323/205 |
| 2003/0076075 A1 * | 4/2003 | Ma et al. | 323/209 |
| 2005/0015182 A1 * | 1/2005 | Bebic et al. | 700/286 |
| 2008/0001581 A1 * | 1/2008 | Takeda et al. | 323/210 |
| 2008/0265848 A1 * | 10/2008 | Berggren et al. | 323/211 |
| 2010/0001698 A1 * | 1/2010 | Johnson | 323/209 |
| 2010/0194357 A1 * | 8/2010 | Benchaib et al. | 323/205 |
| 2010/0237835 A1 * | 9/2010 | Takeda et al. | 323/211 |
| 2010/0327823 A1 * | 12/2010 | Nisenblat | 323/206 |
| 2011/0181044 A1 * | 7/2011 | Scott et al. | 290/7 |
| 2011/0241757 A1 * | 10/2011 | Johnson | 327/440 |
| 2011/0254518 A1 * | 10/2011 | Angquist et al. | 323/208 |

FOREIGN PATENT DOCUMENTS

| | | |
|---|---|---|
| JP | 8-265122 A | 10/1996 |
| JP | 2003-70251 A | 3/2003 |

\* cited by examiner

STATIC VAR COMPENSATOR INCLUDING SERIES CIRCUITS OF THREE PHASES THAT ARE DELTA-CONNECTED TO THREE-PHASE AC BUSES

BACKGROUND OF THE INVENTION

1. Field of the Invention

The present invention relates to a static var compensator, and more specifically to a static var compensator using a TSC (Thyristor Switched Capacitor).

2. Description of the Background Art

In order to compensate for reactive power of an electric power system, TSCs are used. Specifically, the TSCs that are series circuits each including a capacitor and a thyristor are connected in parallel to a transmission line to thereby supply leading reactive power to the system.

For example, Japanese Patent Laying-Open No. 62-244268 (hereinafter Patent Literature 1) discloses TSCs formed by delta-connecting three-phase series circuits each including a reactor, a capacitor, and a thyristor switch. Patent Literature 1 discloses a triggering method for thyristor switches forming the TSCs in order to reduce a difference of the triggering timing between the thyristor switches. Following the triggering method according to Patent Literature 1, all series-connected thyristor switches to be triggered are triggered almost simultaneously.

In the static var compensator, it is common to configure thyristor switches in the form of a thyristor valve and thereby ensure a required breakdown voltage and/or a required capacity.

In the TSCs, when the thyristor switches are turned off, the capacitors are charged to cause a large difference of the voltage between the terminals of the thyristor switches of different phases. It is accordingly required to provide an adequate insulation distance between the phases, which leads to a problem of an increase in size and cost of the thyristor valve. Patent Literature 1, however, does not give consideration at all to the voltage difference between the thyristor switches of different phases that occurs when the thyristor switches are turned off.

SUMMARY OF THE INVENTION

An object of the present invention is to downsize a static var compensator having TSCs of three phases, by shortening the required insulation distance between the phases of the thyristor switches.

In summary, the present invention is a static var compensator including series circuits of three phases that are delta-connected to three-phase AC buses. The series circuits each include a capacitor and a thyristor switch that are electrically connected in series. The thyristor switches of the three phases are mounted so that the terminal-to-terminal distance between the thyristor switches of respective phases are not uniform. The series circuit of one of the three phases is configured opposite to the series circuits of the remaining two phases, in terms of a connection order in which the thyristor switch and the capacitor are electrically connected along a loop path made up of the delta-connected series circuits. Among the series circuits of the three phases, the series circuit of a first phase and the series circuit of a second phase having a shortest terminal-to-terminal distance between respective thyristor switches are arranged so that the series circuits of the first and second phases are opposite to each other in terms of the electrical order in which the thyristor switch and the capacitor are connected along the loop path made up of the delta-connected series circuits.

A chief advantage of the present invention is therefore that the static var compensator having the three-phase TSCs can be reduced in size and cost by shortening the required insulation distance between the thyristor switches of respective phases.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
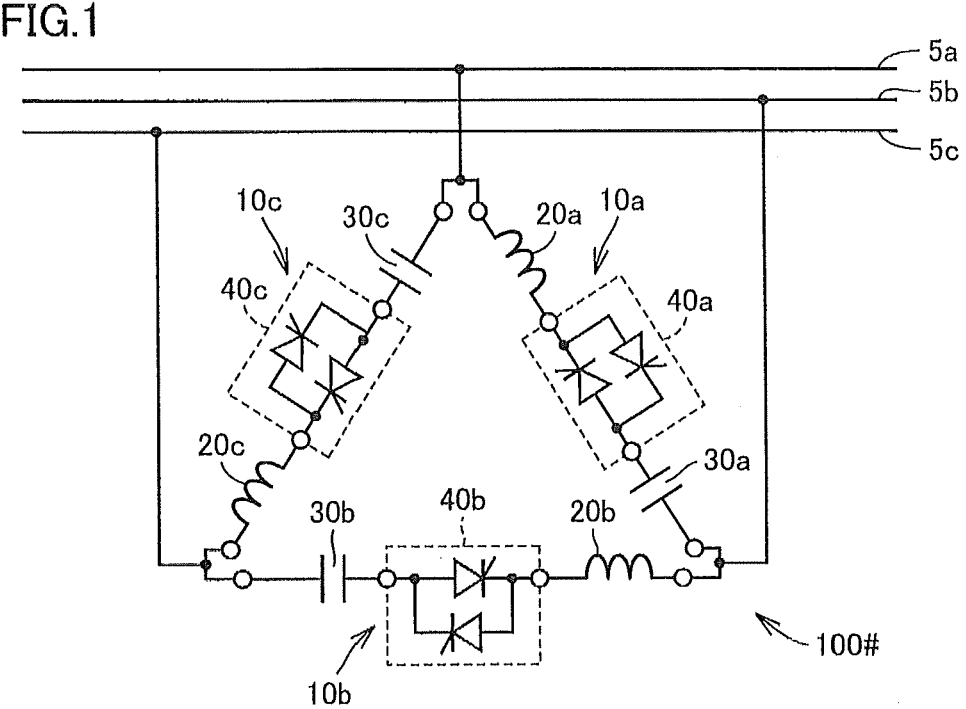
FIG. 1 is a circuit configuration diagram of a static var compensator shown as a comparative example.

Embodiments of the present invention will hereinafter be described in detail with reference to the drawings. In the following, the same or like components in the drawings are denoted by the same reference characters, and a description thereof will not be repeated in principle.

Description of Comparative Example

FIG. 1 is a circuit configuration diagram of a static var compensator 100 shown as a comparative example.

Static var compensator 100# includes delta-connected TSCs 10a, 10b, 10c of three phases. A-phase TSC 10a has a reactor 20a, a capacitor 30a, and a thyristor switch 40a that are connected in series between three-phase AC buses 5a and 5b. Likewise, b-phase TSC 10b has a reactor 20b, a capacitor 30b, and a thyristor switch 40b connected in series between three-phase AC buses 5b and 5c. C-phase TSC 10c has a reactor 20c, a capacitor 30c, and a thyristor switch 40c connected in series between three-phase AC buses 5c and 5a.

Thyristor switches 40a, 40b, 40c are each composed of two thyristor devices connected in antiparallel to each other. Thyristor switches 40a, 40b, 40c are each turned on in response to a gate pulse signal from a controller (not shown). The thyristor switches 40a, 40b, 40c each having been turned on are turned off when the current becomes zero while the gate pulse signal is off.

In static var compensator 100# of the comparative example, TSCs 10a, 10b, 10c of the three phases are identical to each other in terms of the order in which the reactor, the thyristor switch, and the capacitor are electrically connected along a loop path made up of the delta-connected TSCs. Therefore, the order in which the thyristor switch and the capacitor are electrically connected along this loop path is also common to the three phases.

Figure 2:
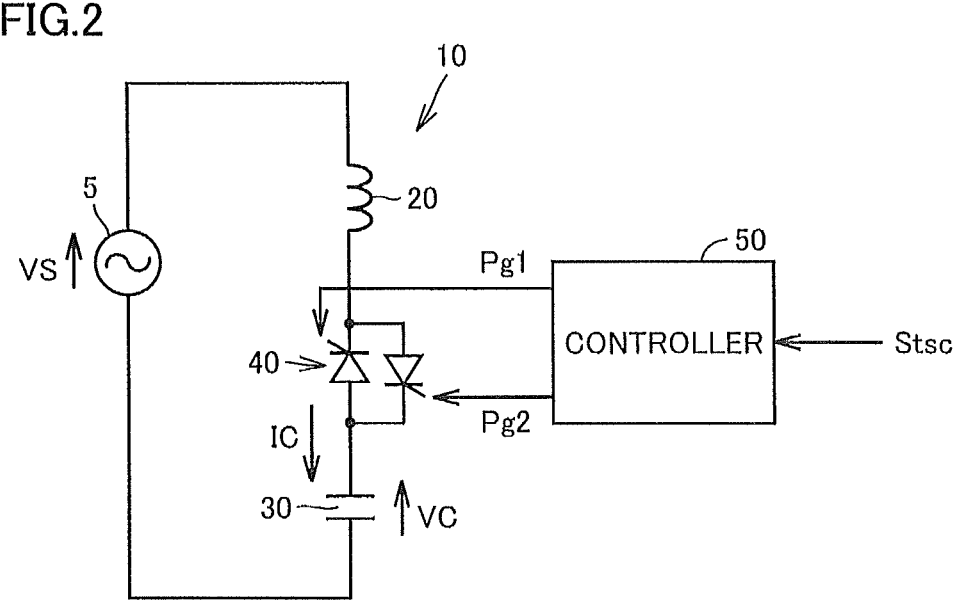
FIG. 2 is a circuit diagram for illustrating a circuit operation of a TSC of each phase.

FIG. 2 is a circuit diagram for illustrating an operation of the TSC of each phase. Since the circuit configuration and the operation of the TSC are common to the three phases, FIG. 2 shows TSC 10 of one of the phases. In the following, TSCs 10a, 10b, 10c of the three phases shown in FIG. 1 may be collectively referred to simply as "TSC 10" where appropriate. Likewise, three-phase AC buses 5a, 5b, 5c may be collectively referred to simply as "three-phase AC bus 5" where appropriate.

Reactors 20a, 20b, 20c may also be collectively referred to simply as "reactor 20" where appropriate, capacitors 30a, 30b, 30c may also be collectively referred to simply as "capacitor 30" where appropriate, and thyristor switches 40a, 40b, 40c may also be collectively referred to simply as "thyristor switch 40" where appropriate.

Referring to FIG. 2, three-phase AC line voltage VS is applied from three-phase AC bus 5 to TSC 10. TSC 10 has reactor 20, thyristor switch 40, and capacitor 30 which are connected in series. To thyristor switch 40, gate pulse signals Pg1, Pg2 are output from a controller 50 for controlling ON and OFF of the switch.

Figure 3:
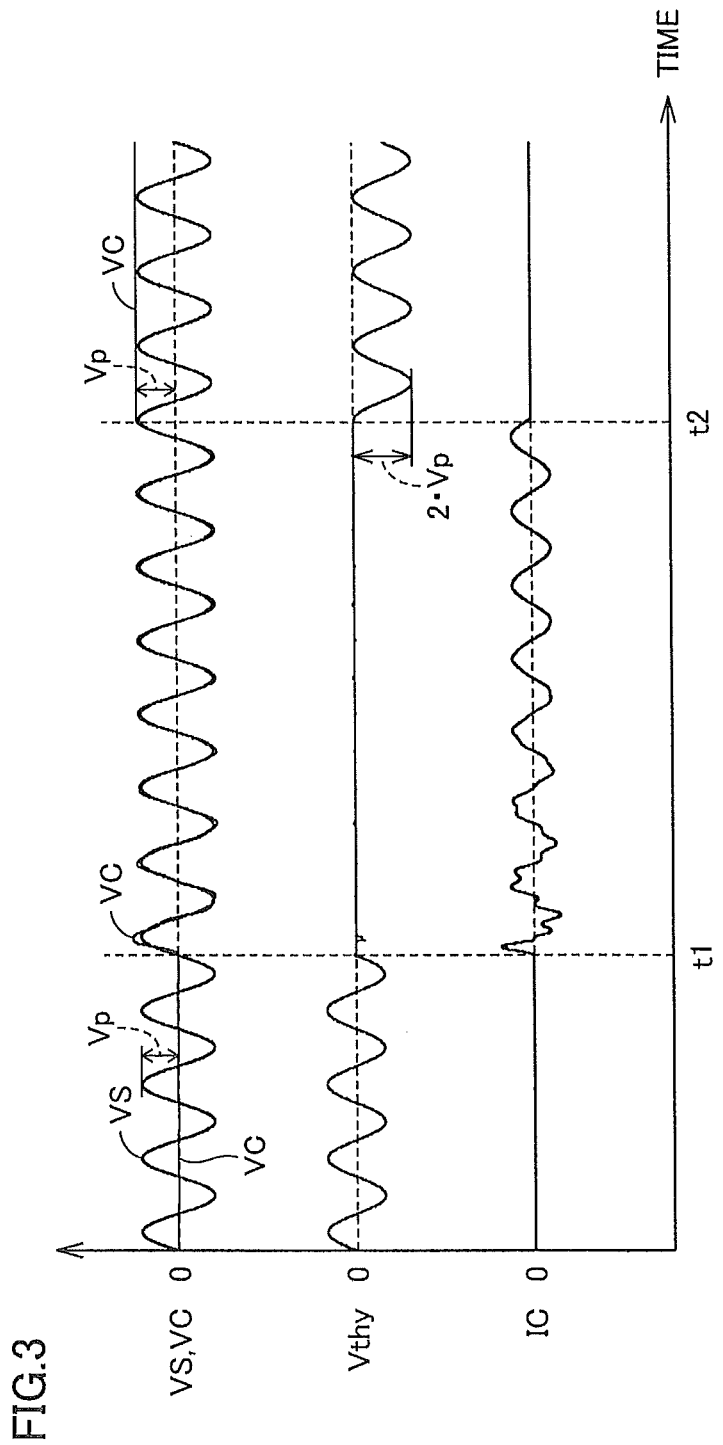
FIG. 3 is a simulation waveform chart illustrating an operation of the TSC (of one of the phases) shown in FIG. 2.

FIG. 3 is a simulation waveform chart illustrating an operation of the TSC of one of the phases that is shown in FIG. 2.

Referring to FIG. 3, line voltage VS is an AC voltage of a predetermined frequency having amplitude Vp.

Until time t1, thyristor switch 40 is OFF and TSC 10 is also OFF. Therefore, voltage Vthy across the terminals of thyristor switch 40 is similar to the line voltage. Meanwhile, voltage VC of capacitor 30 (hereinafter capacitor voltage VC) is VC=0.

At time t1, TSC 10 is turned on and capacitor 30 is electrically connected to three-phase AC bus 5. In the case where TSC 10 is to be turned on, controller 50 causes gate pulse signals Pg1, Pg2 to be made ON at the time when the voltage across the terminals of thyristor switch 40 becomes zero (Vthy=0).

From time t1 to time t2, TSC 10 is ON and therefore voltage Vthy is Vthy=0 and capacitor current IC flows in the TSC. Capacitor voltage VC is equivalent to line voltage VS.

At time t2, TSC 10 is turned off. After controller 50 causes gate pulse signals Pg1, Pg2 to be made OFF, thyristor switch 40 is turned off at the time when capacitor current IC flowing in thyristor switch 40 becomes zero. Accordingly, capacitor 30 is electrically disconnected from three-phase AC bus 5.

At time t2 (IC=0) at which thyristor switch 40 is turned off, capacitor 30 is charged to peak value Vp of line voltage VS. Therefore, if an increase of the capacitor voltage induced by reactor 20 is ignored, the voltage applied across the terminals of thyristor switch 40 after thyristor switch 40 is turned off is line voltage VS on which the capacitor charging voltage (Vp) is superimposed. Thus, a maximum voltage (absolute value) applied across the terminals of thyristor switch 40 is twice the peak value of the line voltage (2·Vp).

Figure 4:
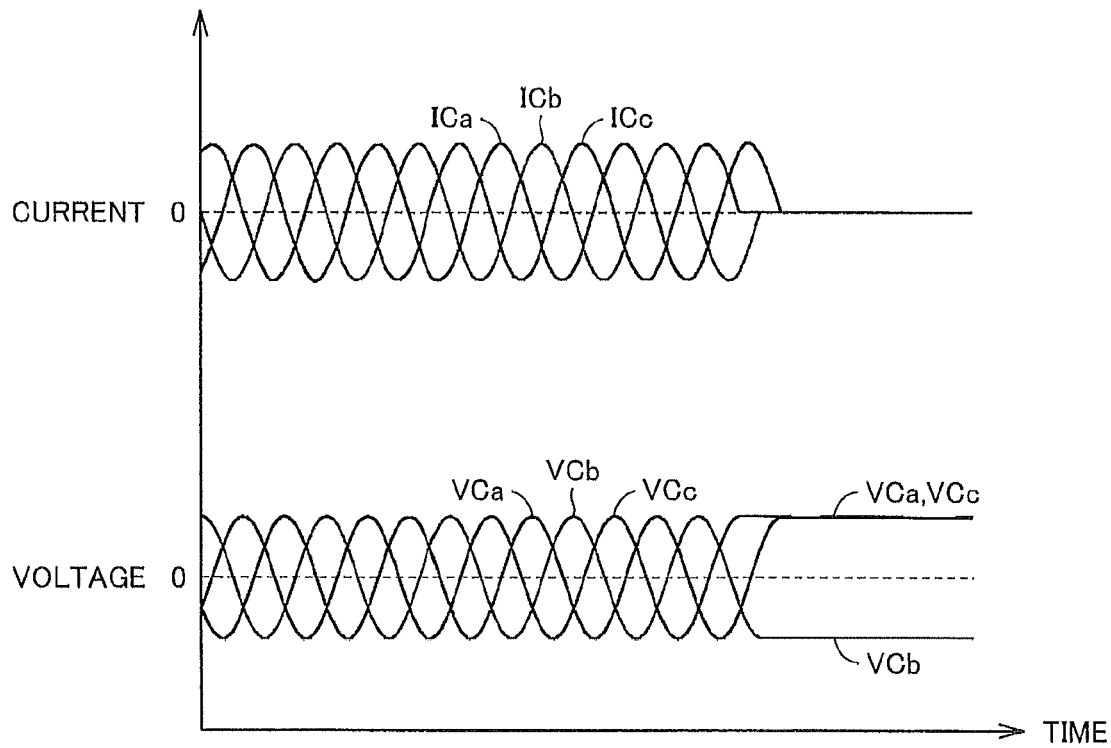
FIG. 4 is a simulation waveform chart illustrating operations of the TSCs (of three phases) in the static var compensator of the comparative example.

FIG. 4 is an operation waveform chart of the TSCs (of the three phases) in static var compensator 100# of the comparative example.

Referring to FIG. 4, the three-phase AC phase voltages transmitted by three-phase AC buses 5a, 5b, 5c respectively are shifted from each other by a phase difference of 120°. Therefore, respective capacitor currents ICa, ICb, ICc of capacitors 30a, 30b, 30c are also shifted from each other by a phase difference of 120°. Likewise, respective capacitor voltages VCa, VCb, VCc applied to capacitors 30a, 30b, 30c are also shifted from each other by a phase difference of 120°.

When an instruction is given to turn off TSCs 10a, 10b, 10c, controller 50 (FIG. 2) causes the gate pulse signal to be made OFF. Then, at respective timings at which capacitor currents ICa, ICb, ICc become zero, thyristor switches 40a, 40b, 40c are turned off respectively.

As described above in connection with FIG. 3, the voltages applied across the terminals of thyristor switches 40a, 40b, 40c when the TSCs are turned off are influenced by capacitor voltages VCa, VCb, VCc at the time when the TSCs are turned off. Due to the phase difference of 120° as described above, the capacitors of two phases among capacitors 30a, 30b, 30c are charged with voltages of the same polarity when the TSCs are turned off. Meanwhile, the capacitor of the remaining one phase is charged with a voltage of the opposite polarity. In the example of FIG. 4, capacitors 30a, 30c are charged with a positive voltage (+Vp) while capacitor 30b is charged with a voltage (−Vp) of the opposite polarity.

Figure 5:
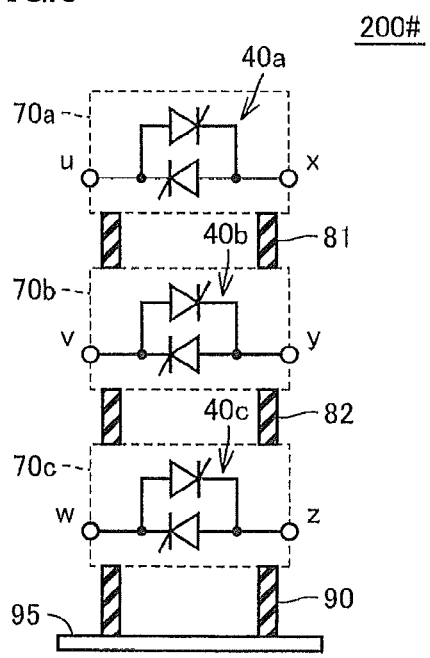
FIG. 5 is a conceptual diagram illustrating a configuration of a thyristor valve for configuring thyristor switches.

FIG. 5 shows a general configuration of a thyristor valve 200# for configuring thyristor switches 40a, 40b, 40c.

Referring to FIG. 5, thyristor valve 200# includes thyristor switch units 70a, 70b, 70c of the three phases, phase-to-phase insulation support insulators 81, 82, a phase-to-ground insulation support insulator 90, and a valve base 95.

Thyristor switch unit 70a has, between a terminal u and a terminal x, two antiparallel-connected thyristor devices which constitute thyristor switch 40a. Likewise, thyristor switch unit 70b has, between a terminal v and a terminal y, two antiparallel-connected thyristor devices which constitute thyristor switch 40b. Thyristor switch unit 70c also has, between a terminal w and a terminal z, two antiparallel-connected thyristor devices which constitute thyristor switch 40c.

Thyristor switch units 70a, 70b, 70c of the three phases are vertically stacked on each other on valve base 95. Insulation between the phases is provided by phase-to-phase insulation support insulators 81, 82. Insulation between the phase and the ground is provided by phase-to-ground insulation support insulator 90.

In the example in FIG. 5, insulation between thyristor switch units 70a and 70b (between terminals x and y and between terminals u and v) is given by phase-to-phase insulation support insulator 81 Insulation between thyristor switch units 70b and 70c (between terminals y and z and between terminals v and w) is also given by phase-to-phase insulation support insulator 82. Moreover, insulation between thyristor switch units 70c and 70a (between terminals z and x and terminals w and u) is given by phase-to-phase insulation support insulators 81 and 82. Insulation between thyristor switch unit 70c and valve base 95 is given by phase-to-ground insulation support insulator 90.

Figure 6:
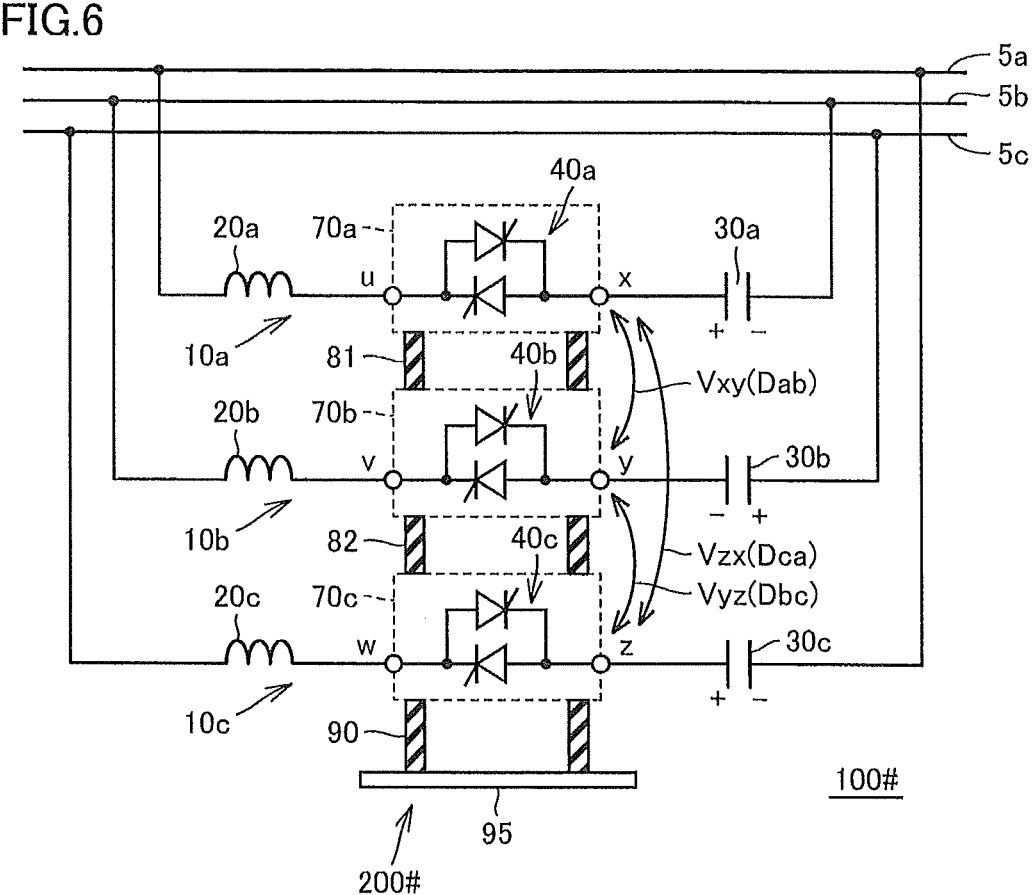
FIG. 6 is a conceptual diagram illustrating a structure of a thyristor valve applied to the static var compensator of the comparative example.

FIG. 6 shows a configuration of static var compensator 100# of the comparative example to which the thyristor valve shown in FIG. 5 is applied.

Referring to FIG. 6, static var compensator 100# includes thyristor switches 40a, 40b, 40c configured in the form of thyristor valve 200# shown in FIG. 5, reactors 20a, 20b, 20c, and capacitors 30a, 30b, 30c.

Terminal u (thyristor switch unit 70a), terminal v (thyristor switch unit 70b), and terminal w (thyristor switch unit 70c) that are located on the same side are electrically connected to three-phase AC buses 5a, 5b, 5c through reactors 20a, 20b, 20c, respectively.

Likewise, terminal x (thyristor switch unit 70a), terminal y (thyristor switch unit 70b), and terminal z (thyristor switch unit 70c) are electrically connected to three-phase AC buses 5b, 5c, 5a through capacitors 30a, 30b, 30c, respectively.

Between the a phase and the b phase, voltage Vxy between terminals x and y is applied across the opposite ends of phase-to-phase insulation support insulator 81. Between terminals u and v as well, an equivalent voltage is applied. In the following, the distance between terminals x and y and the distance between terminals u and v will be referred to collectively as phase-to-phase distance Dab.

Likewise, between the b phase and the c phase, voltage Vyz between terminals y and z is applied across the opposite ends of phase-to-phase insulation support insulator 82. Between terminals v and w as well, an equivalent voltage is applied. In the following, the distance between terminals y and z and the distance between terminals v and w will be referred to collectively as phase-to-phase distance Dbc.

Moreover, between the c phase and the a phase, voltage Vzx between terminals z and x is applied across the opposite ends of phase-to-phase insulation support insulators 81 and 82. Across terminals w and u as well, an equivalent voltage is applied. In the following, the distance between terminals z and x and the distance between terminals w and u will be referred to collectively as phase-to-phase distance Dca.

In static var compensator 100# of the comparative example, voltages Vxy, Vyz, Vzx between the terminals of thyristor switch units 70a, 70b, 70c are represented by the following expressions (1) to (3):

$$Vxy = VSbc + VCa - VCb \qquad (1)$$

$$Vyz = VSca + VCb - VCc \qquad (2)$$

$$Vzx = VSab + VCc - VCa \qquad (3)$$

where VSab is a line voltage between three-phase AC buses 5a and 5b, VSbc is a line voltage between three-phase AC buses 5b and 5c, and VSca is a line voltage between three-phase AC buses 5c and 5a.

As described above in connection with FIG. 4, when TSCs are turned off, capacitors of two phases and a capacitor of a remaining one phase among capacitors 30a to 30c are charged with voltages of respective polarities different from each other. Here, following the example in FIG. 4, it is supposed that a-phase capacitor 30a and c-phase capacitor 30c are charged with a peak voltage (+Vp) of the positive polarity and b-phase capacitor 30b is charged with a peak voltage (−Vp) of the negative polarity.

At this time, respective peak values of voltages Vxy, Vyz, Vzx between the terminals of the thyristor valve when the TSCs are turned off are represented by the following expressions (4) to (6):

$$Vxy(p) = 3 \cdot Vp \qquad (4)$$

$$Vyz(p) = 3 \cdot Vp \qquad (5)$$

$$Vzx(p) = Vp \qquad (6)$$

Namely, a maximum voltage applied between terminals x and y and between terminals y and z is three times as high as the peak value of the power supply voltage (line voltage).

Figure 7:
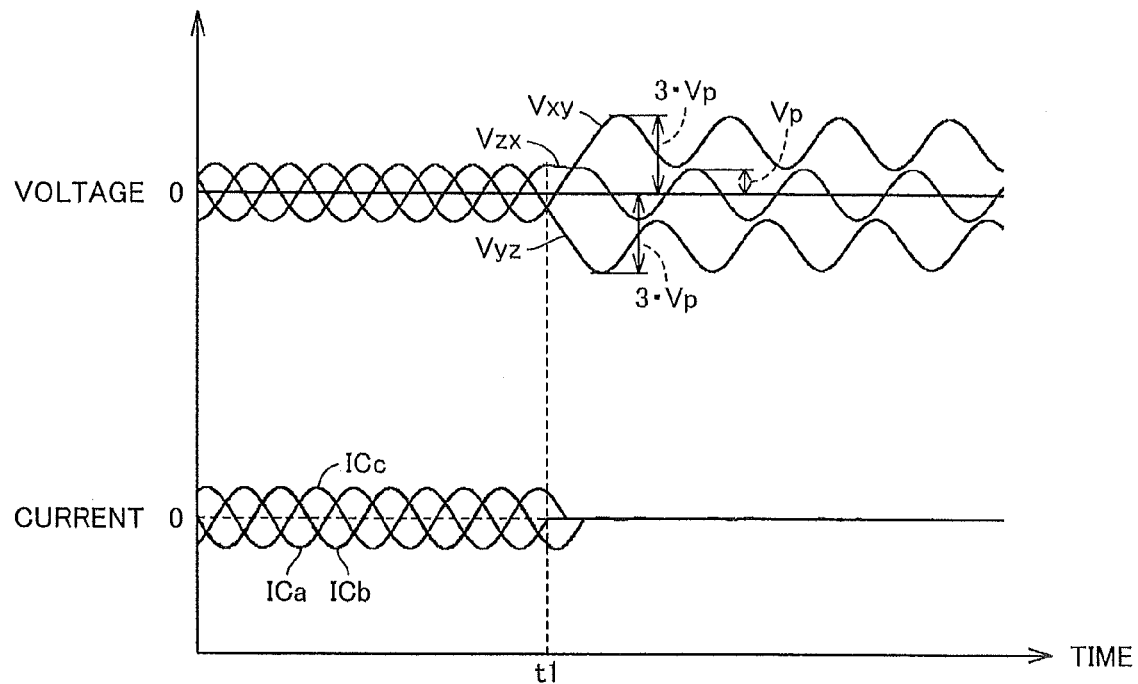
FIG. 7 is a simulation waveform chart illustrating an operation when the TSC is OFF in the static var compensator of the comparative example.

FIG. 7 shows a simulation waveform chart for illustrating an operation of static var compensator 100# of the comparative example to which the thyristor valve shown in FIG. 5 is applied. In FIG. 7, simulation waveforms of capacitor currents ICa, ICb, ICc of respective phases and voltages Vxy, Vyz, Vzx across terminals of the thyristor valve are shown.

Referring to FIG. 7, the TSCs are first in the ON state. At time t1, the gate pulse signal for each thyristor switch is made OFF. Accordingly, at respective times at which capacitor currents ICa, ICb, ICc become zero, thyristor switches 40a, 40b, 40c are successively turned off.

Until time t1 to which the TSCs are ON, voltages Vxy, Vyz, Vzx correspond to line voltage VS between two buses of three-phase AC buses 5a, 5b, 5c. In contrast, after time t1, the capacitor charging voltage at the time when the TSC is turned off on which the power supply voltage (line voltage VS) is superimposed is applied between terminals x and y, between terminals y and z, and between terminals z and x.

Therefore, Vxy(p) which is the maximum value of the voltage difference (absolute value) between terminals x and y is three times as high as the peak value of the line voltage (3·Vp). Vyz(p) between terminals y and z is also Vyz(p)=3·Vp. The remaining Vzx(p) between terminals z and x is Vzx(p)=Vp.

Thus, regarding two of the voltage difference between terminals x and y, the voltage difference between terminals y and z, and the voltage difference between terminals z and x, a voltage difference of the maximum value 3·Vp is generated. The terminals between which this voltage difference is generated vary depending on the phase for which the TSC is turned off. Therefore, it is necessary to design the thyristor valve so that insulation against a voltage difference of 3·Vp is ensured, for each of the phase-to-phase distance Dab between the a phase and the b phase, the phase-to-phase distance Dbc between the b phase and the c phase, and the phase-to-phase distance Dca between the c phase and the a phase.

Accordingly, it is necessary to have large insulation distances between terminals x and y (between terminals u and v), between terminals y and z (between terminals v and w), and between terminals z and x (between terminals w and u). As a result, the thyristor valve including the insulators has large dimensions, which may lead to a problem of the need for an adequate space for arranging the devices and a problem of an increase of the cost.

In view of the above, the present embodiment provides a configuration of the static var compensator with the purpose of downsizing the thyristor valve by reducing the peak value of the voltage between the terminals of the thyristor switch units of different phases.

First Embodiment

Figure 8:
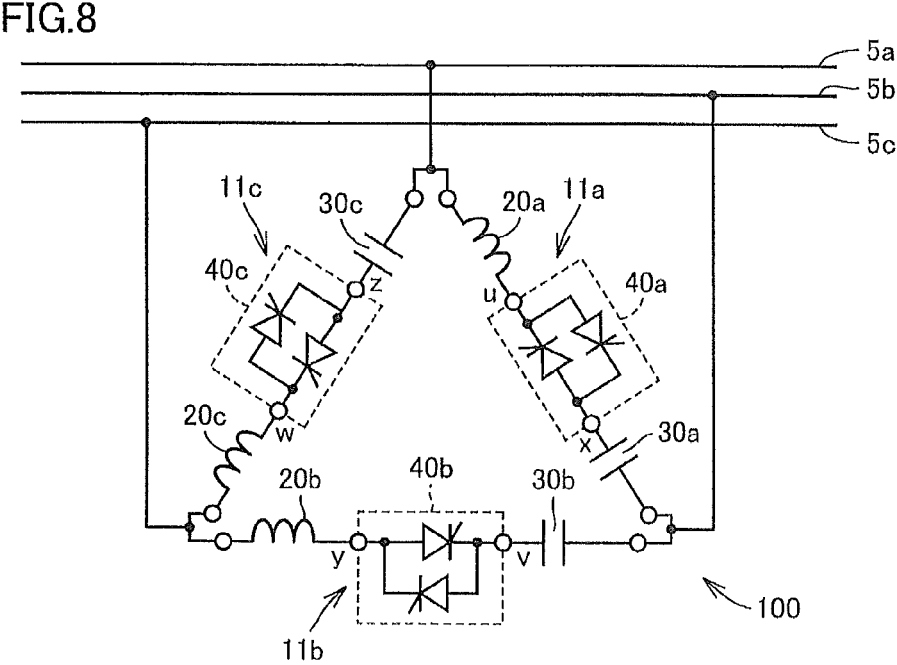
FIG. 8 is a circuit configuration diagram of a static var compensator according to a first embodiment.

FIG. 8 is a circuit configuration diagram of a static var compensator according to a first embodiment.

Referring to FIG. 8, static var compensator 100 according to the first embodiment includes TSCs 11a, 11b, 11c of three phases that are delta-connected to three-phase AC buses 5a, 5b, 5c.

TSCs 11a, 11b, 11c each include, like TSCs 10a, 10b, 10c in FIG. 1, a reactor 20, a capacitor 30, and a thyristor switch 40 connected in series between two three-phase AC buses 5.

TSCs 11a, 11b, 11c, however, differ from TSCs 10a, 10b, 10c in FIG. 1 in that the order in which the reactor, the thyristor switch, and the capacitor are electrically connected along the loop path made up of the delta-connected TSCs is different between any one of the three phases and the remaining two phases. Therefore, the order in which the thyristor switch and the capacitor are electrically connected along the loop path is common to the two phases while this order of the remaining one phase is opposite to that of the two phases.

In the example in FIG. 8, the a phase and the c phase, namely TSC 11a and TSC 11c have a common order in which reactors 20a, 20c, thyristor switches 40a, 40c, and capacitors 30a, 30c are electrically connected along the loop path made up of the delta-connected TSCs. In contrast, in the b-phase TSC 11b, the order in which reactor 20b and capacitor 30b are electrically connected is opposite to that of the a phase and the c phase.

As a result, the order in which thyristor switch 40 and capacitor 30 are electrically connected along the loop path is common to only the a phase (TSC 11a) and the c phase (TSC 11c). The a phase (TSC 11a) and the b phase (TSC 11b) are opposite to each other and the b phase (TSC 11b) and the c phase (TSC 11c) are opposite to each other in terms of the order in which thyristor switch 40 and capacitor 30 are electrically connected.

Figure 9:
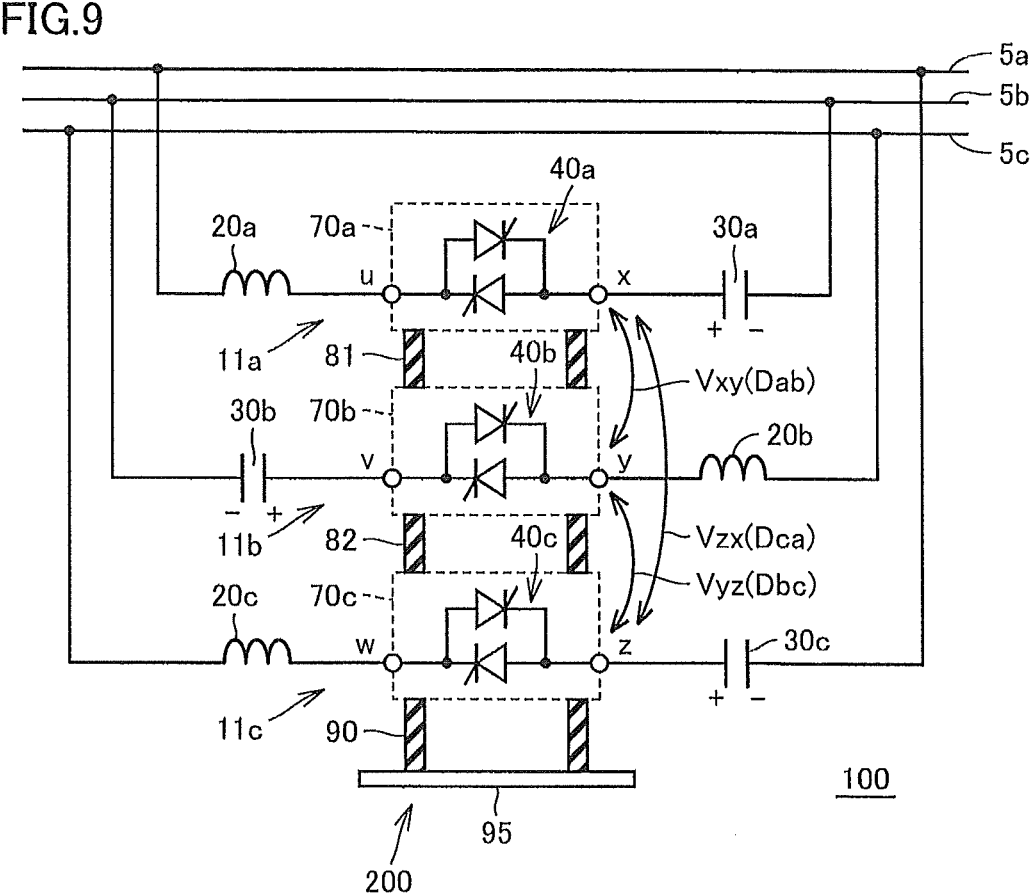
FIG. 9 is a conceptual diagram illustrating a structure of a thyristor valve applied to the static var compensator according to the first embodiment.

FIG. 9 is a conceptual diagram illustrating a structure of a thyristor valve 200 applied to the static var compensator according to the first embodiment.

From a comparison between FIG. 9 and FIG. 6, it is seen that static var compensator 100 of the first embodiment differs from static var compensator 100# of the comparative example shown in FIG. 6 in that respective positions where reactor 20b and capacitor 30b of TSC 11b (b phase) are connected are opposite to those of TSC 10b in FIG. 6. Features of other components of static var compensator 100 in the first embodiment are similar to those of static var compensator 100# of the comparative example, and therefore, the detailed description of them will not be repeated.

Accordingly, regarding terminal u, terminal v, and terminal w located on the same side, terminal u and terminal w of the a phase and the c phase are electrically connected through reactors 20a, 20c to three-phase AC buses 5a, 5c, while terminal v of the b phase is electrically connected through capacitor 30b to three-phase AC bus 5b.

Likewise, regarding terminal x, terminal y, and terminal z, terminal x and terminal z of the a phase and the c phase are electrically connected through capacitors 30a, 30c to three-phase AC buses 5b, 5a, while terminal y of the b phase is electrically connected through reactor 20b to three-phase AC bus 5c.

Thus, regarding static var compensator 100, the a phase and the b phase as well as the b phase and the c phase that are closely arranged so that they are physically adjacent are opposite to each other in terms of the order in which thyristor switch 40 and capacitor 30 are electrically connected. In contrast, the a phase and the c phase that are arranged relatively far from each other have the common order in which thyristor switch 40 and capacitor 30 are electrically connected.

Figure 10:
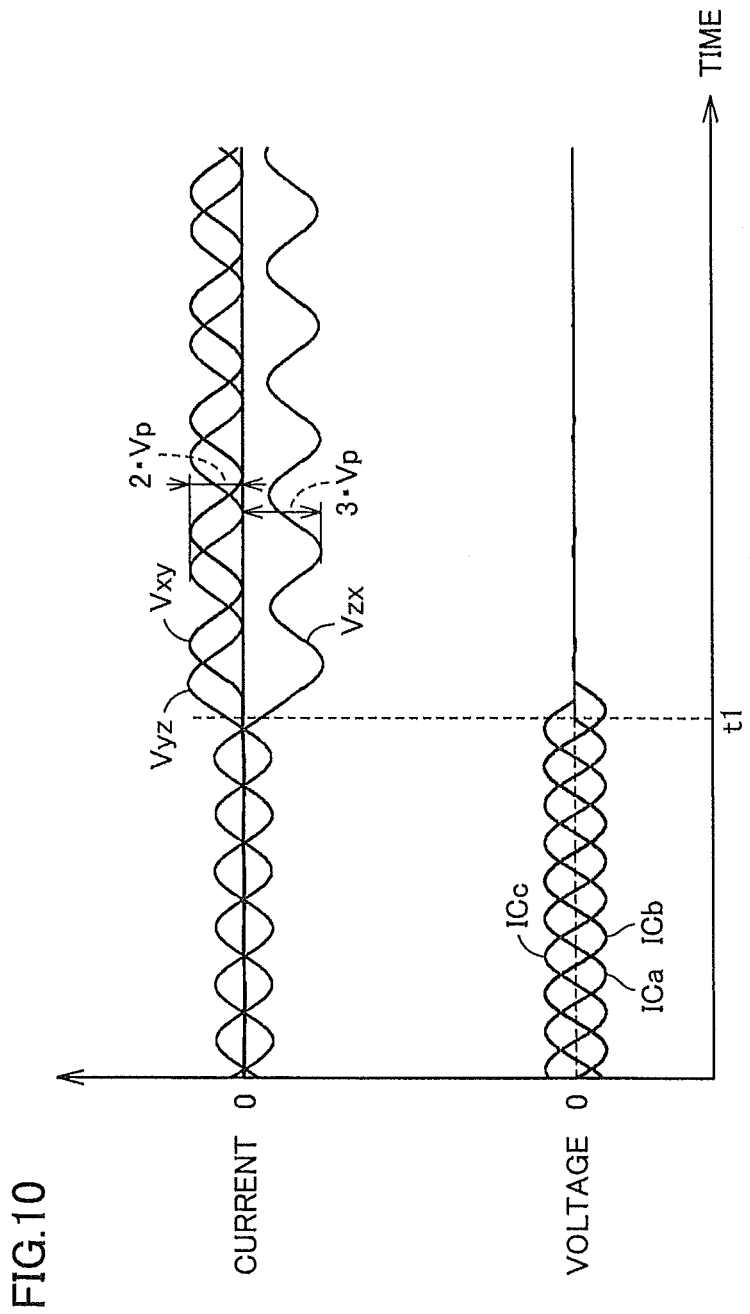
FIG. 10 is a simulation waveform chart illustrating operations of TSCs (of three phases) in the static var compensator according to the first embodiment.

FIG. 10 is a simulation waveform chart illustrating operations of the TSCs (of the three phases) in the static var compensator according to the first embodiment.

FIG. 10 shows, similarly to FIG. 7, simulation waveforms of capacitor currents ICa, ICb, ICc of respective phases and voltages Vxy, Vyz, Vzx between terminals of the thyristor valves of different phases, in the case where the TSCs are operated so that they are ON until time t1 and the gate pulse signal is made OFF at time t1.

At time t1, the gate pulse signal for each thyristor switch is made OFF. Accordingly, at respective times at which capacitor currents ICa, ICb, ICc become zero, thyristor switches 40a, 40b, 40c are successively turned off.

In this case, voltages Vxy, Vyz, Vzx between terminals of the thyristor valves of different phases are represented by the following expressions (7) to (9) different from the above expressions (1) to (3), since the order in which the components are electrically connected are different as described above.

$$Vxy = VSbc + VCa \quad (7)$$

$$Vyz = VSca + VCc \quad (8)$$

$$Vzx = VSab + VCc - VCa \quad (9)$$

As described above, when thyristor switch 40 is turned off, the capacitor charging voltage of any two phases of the three phases is the positive peak value (+Vp) of the power supply voltage (line voltage), while the capacitor charging voltage of the remaining one phase is the negative peak value (−Vp) of the power supply voltage (line voltage).

Here, as seen from expressions (7) to (9), the peak value (magnitude) of voltages Vxy, Vyz between the terminals is not influenced by the polarity of the charging voltage of capacitors 30a, 30c at the time when the TSCs are turned off. When the a-phase capacitor 30a and the c-phase capacitor 30c are charged with voltages of the opposite polarities, the peak value of voltage Vzx between terminals is a maximum value. In view of this, a consideration is given to an example where the a-phase capacitor 30a and the b-phase capacitor 30b are charged with the positive peak value (+Vp) and the c-phase capacitor 30c is charged with the negative peak value (−Vp).

In FIG. 10, simulation waveforms of voltages Vxy, Vyz, Vzx between terminals in this case are shown. After time t1, the capacitor charging voltage at the time when the TSC is turned off on which the power supply voltage (line voltage VS) is superimposed is applied between terminals x and y, between terminals y and z and between terminals z and x.

As a result, respective peak values (absolute values) of voltages Vxy, Vyz, Vzx between terminals of the thyristor valve at the time when the TSCs are turned off are represented by the following expressions (10) to (12).

$$Vxy(p) = 2 \cdot Vp \quad (10)$$

$$Vyz(p) = 2 \cdot Vp \quad (11)$$

$$Vzx(p) = 3 \cdot Vp \quad (12)$$

As seen from FIG. 10 and expressions (10) to (12), in static var compensator 100 of the first embodiment, the peak value Vxy(p) of the voltage between terminals of the a phase and the b phase arranged adjacently to each other and the peak value Vyz(p) of the voltage across terminals of the b phase and the c phase are reduced to two thirds of the peak value (3·Vp) in static var compensator 100# of the comparative example. Consequently, the insulation distance can also be reduced to two thirds, and accordingly, phase-to-phase distances Dab and Dbc in static var compensator 100 can also be reduced to two thirds of those in static var compensator 100#.

While peak value Vzx(p) of the voltage across terminals of the a phase and the c phase is equivalent to that of the comparative example, the phase-to-phase distance Dca between the a phase and the c phase is the sum of phase-to-phase distances Dab and Dbc and therefore four thirds of phase-to-phase distance Dab/Dbc of the comparative example in FIG. 6. Since phase-to-phase distances Dab, Dbc in FIG. 6 are designed so that insulation against a voltage difference of 3·Vp is ensured, it is seen that phase-to-phase distance Dca in FIG. 9 can ensure insulation between the a phase and the c phase even if the peak value 3·Vp is applied.

Thus, in static var compensator 100 of the first embodiment, thyristor switch units 70a, 70b, 70c forming the TSCs of the three phases are mounted so that the phase-to-phase distances Dab, Dbc, Dca between the terminals are not equal to each other. Under this condition, the TSC of any one of the three phases is configured so that the order in which thyristor switch 40 and capacitor 30 are electrically connected along the loop path made up of the delta-connected TSCs is opposite to that of the remaining two phases.

Furthermore, in the configuration of the thyristor valve, respective TSCs of the phases that are opposite to each other in terms of the order in which thyristor switch 40 and capacitor 30 are electrically connected are arranged relatively close to each other, while respective TSCs of the phases that have the common order in which they are electrically connected are arranged relatively far from each other.

As a result, TSCs 11 of two phases that are arranged in thyristor valve 200 so that the phase-to-phase distance between these phases is shortest are opposite to each other in terms of the order in which thyristor switch 40 and capacitor 30 are electrically connected. For example, in FIG. 9, the TSCs that are arranged physically adjacently to each other and therefore have the shortest phase-to-phase distance therebetween, specifically TSCs 11 of the a phase and the b phase, and TSCs 11 of the b phase and the c phase, are opposite to each other in terms of the order in which thyristor switch 40 and capacitor 30 are electrically connected.

Furthermore, TSCs 11 of the two phases having the longest phase-to-phase distance therebetween have a common order in which thyristor switch 40 and capacitor 30 are electrically connected. In FIG. 9, TSCs 11 of the a phase and the c phase have the common order in which thyristor switch 40 and capacitor 30 are electrically connected.

By the above-described configuration of the TSC as well as positional relation between thyristor switches of respective phases, the insulation distance necessary for ensuring insulation between the phases is reduced. Consequently, the dimensions of the thyristor valve including the insulators can be reduced, which enables downsizing and reduced cost of the static var compensator.

Second Embodiment

Regarding the first embodiment, an example of the configuration of the thyristor valve has been described in which thyristor switch units 70a to 70c of three phases are vertically stacked on each other. Regarding a second embodiment, a modification of the configuration of the thyristor valve will be described.

Figure 11:
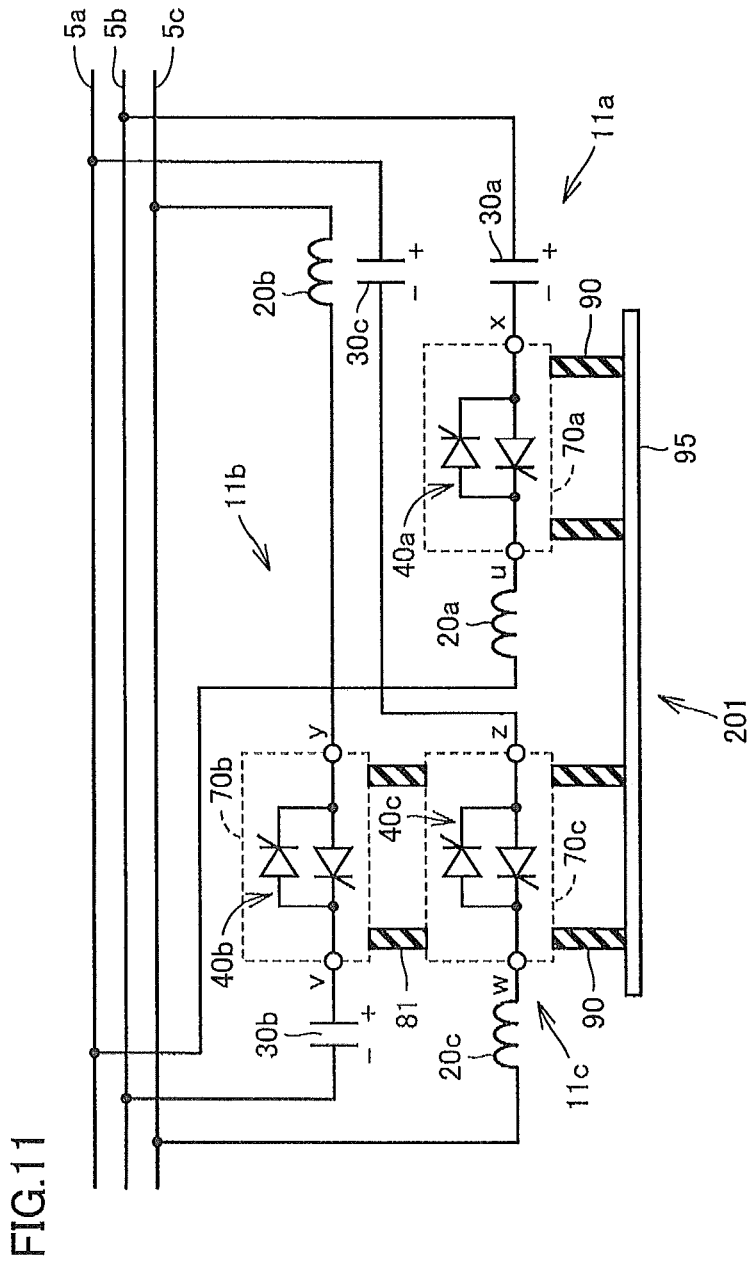
FIG. 11 is a conceptual diagram illustrating a first example of the configuration of a thyristor valve applied to a static var compensator according to a second embodiment.

FIG. 11 is a conceptual diagram illustrating a first example of the configuration of the thyristor valve applied to a static var compensator according to the second embodiment.

Referring to FIG. 11, a thyristor valve 201 according to the first example of the second embodiment differs from thyristor valve 200 shown in FIG. 9 in that thyristor switch units of two phases among thyristor switch units 70a, 70b, 70c of the three phases are stacked on each other, while the thyristor switch unit of the remaining one phase is separately arranged in the form of a single stage. In FIG. 11, the electrical connection between TSCs 11a, 11b, 11c and three-phase AC buses 5a, 5b, 5c is similar to that of FIG. 9, and therefore the detailed description thereof will not be repeated.

In the example in FIG. 11, thyristor switch units 70b and 70c forming TSCs 11b and 11c are stacked on each other on valve base 95, while thyristor switch unit 70a forming TSC 11a is arranged in the form of a single stage on valve base 95 separately from thyristor switch units 70b and 70c.

Thyristor switch units 70b and 70c are insulated from each other, namely terminals v and w are insulated from each other and terminals y and z are insulated from each other by phase-to-phase insulation support insulator 81. Thyristor switch unit 70c (terminals w and z) and valve base 95 are also insulated from each other by phase-to-ground insulation support insulator 90. Likewise, thyristor switch unit 70a (terminals x and u) and valve base 95 are insulated from each other by phase-to-ground insulation support insulator 90.

It should be noted that FIG. 11 shows the position of terminal u of thyristor switch unit 70a that appears to be closer to terminals y and z than to terminals v and w for the sake of convenience of illustration, in order to clarify the relation of connection between three-phase AC buses 5a, 5b, 5c and TSCs 11a, 11b, 11c.

Actually, however, thyristor switch units 70a, 70b, 70c are arranged so that terminals u, v, w are located on one side and terminals x, y, z are located on another side. For example, thyristor switch unit 70a is arranged frontward or backward along the direction perpendicular to the plane of FIG. 11, relative to thyristor switch units 70b, 70c stacked on each other. Namely, as to insulation between TSCs of respective phases, it is necessary to ensure insulation between terminals x, y, and z and insulation between terminals u, v, and w, as required for the first embodiment.

Thyristor valve 201 according to the first example of the second embodiment differs from thyristor valve 200 in FIG. 9 in that the former is suitably applied to such a case where the vertical space is more difficult to reserve while the horizontal space is easier to reserve.

Thyristor valve 201 is also configured so that TSCs of respective phases that are opposite to each other in terms of the order in which thyristor switch 40 and capacitor 30 are electrically connected are arranged relatively close to each other. In the case where TSC 11b of the b phase is opposite to the TSCs of the remaining two phases in terms of the order in which thyristor switch 40 and capacitor 30 are electrically connected, thyristor valve 201 may be configured similarly to the first embodiment so that phase-to-phase distance Dab or Dbc among phase-to-phase distances Dab, Dbc, Dca is shortest, to thereby enable the phase-to-phase insulation distance to be ensured efficiently.

Thus, in thyristor valve 201 as well, thyristor switch units 70a, 70b, 70c are mounted so that TSCs 11 of two phases having the shortest phase-to-phase distance therebetween are opposite to each other in terms of the order in which thyristor switch 40 and capacitor 30 are electrically connected.

In the example in FIG. 11, thyristor switch unit 70b of the b phase is arranged so that it is stacked on another thyristor switch unit, which makes it possible to ensure an insulation distance between the b phase and another phase even if the vertical space is difficult to reserve. Meanwhile, regarding thyristor switch units 70a and 70c of the a phase and the c phase having a common order in which thyristor switch 40 and capacitor 30 are electrically connected, one of the thyristor switch units is arranged in the form of a stack and the other is arranged in the form of a single stage. Accordingly, the horizontal space can be ensured and an adequate insulation distance can be ensured.

Thus, like the first embodiment, the configuration of thyristor valve 201 according to the first example of the second embodiment also enables the dimensions of the thyristor valve including the insulators to be reduced, and therefore enables downsizing and reduced cost of the static var compensator.

While the example configuration in FIG. 11 is provided so that thyristor switch unit 70b of the b phase which is different from the remaining two phases in terms of the order in which thyristor switch 40 and capacitor 30 are electrically connected is arranged in the upper stage of the stack, it may also be arranged in the lower stage. In this case, it is easier to ensure the phase-to-phase distance between two phases having a common order in which thyristor switch 40 and capacitor 30 in TSC 11 are electrically connected.

It should be noted that, in the example configuration in FIG. 11, another phase-to-phase insulation support insulator may further be arranged as required between terminals of thyristor switch units 70b, 70c stacked on each other and the terminals of thyristor switch unit 70a arranged in the form of a single stage.

Figure 12:
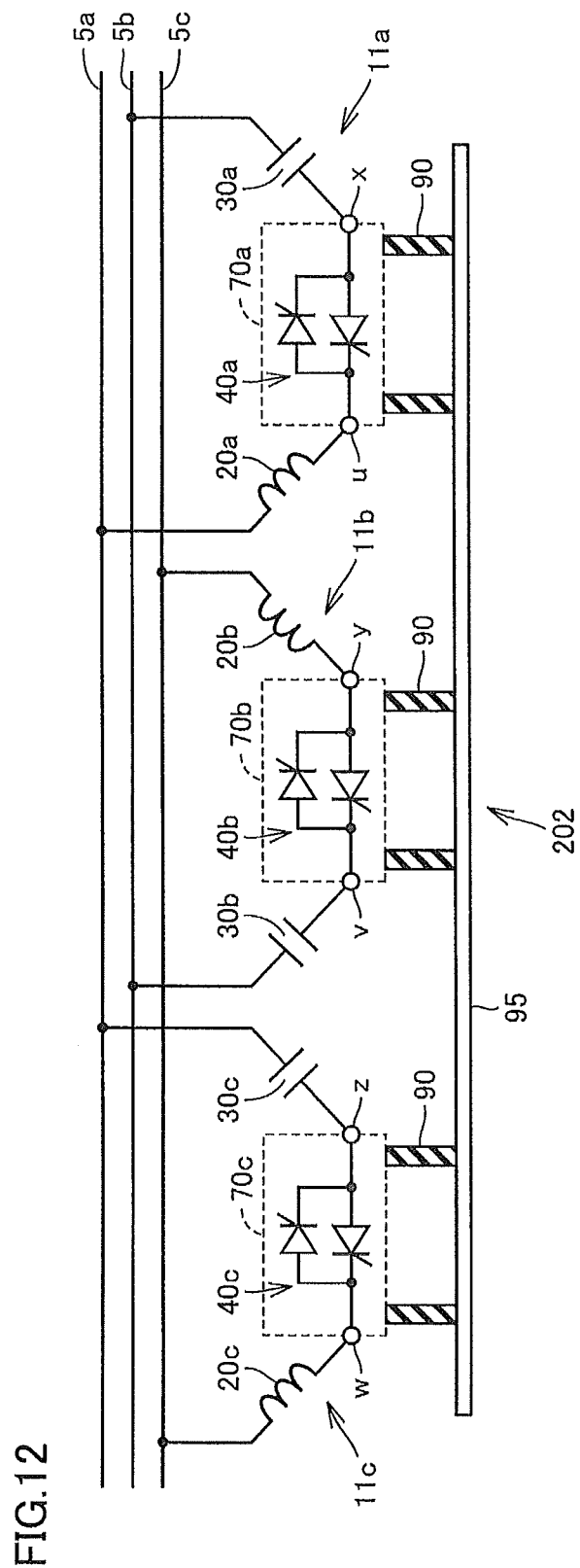
FIG. 12 is a conceptual diagram illustrating a second example of the configuration of a thyristor valve applied to a static var compensator according to the second embodiment.

FIG. 12 is a conceptual diagram illustrating a second example of the configuration of the thyristor valve applied to a static var compensator according to the second embodiment.

Referring to FIG. 12, thyristor valve 202 according to the second example of the second embodiment differs from thyristor valve 200 shown in FIG. 9 in that thyristor switch units 70a, 70b, 70c of three phases are horizontally arranged successively. Regarding FIG. 12 as well, the electrical connection between TSCs 11a, 11b, 11c and three-phase AC buses 5a, 5b, 5c is similar to that of FIG. 9, and therefore the detailed description thereof will not be repeated.

Thyristor valve 202 according to the second example of the second embodiment differs from thyristor valve 201 according to the first example in that the former is suitably applied to such a case where the vertical space is more difficult to reserve while the horizontal space is easier to reserve.

Insulation between valve base 95 and each of thyristor switch unit 70a (terminals x and u), thyristor switch unit 70b (terminals y and v), and thyristor switch unit 70c (terminals z and w) is provided by phase-to-ground insulation support insulator 90.

It should be noted that FIG. 12 shows that thyristor switch units 70a, 70b, 70c are arranged laterally on the plane of FIG. 12 for the sake of convenience of illustration, in order to clarify the relation of connection between three-phase AC buses 5a, 5b, 5c and TSCs 11a, 11b, 11c. Actually, however, thyristor switch units 70a, 70b, 70c are aligned for example along the direction perpendicular to the plane of FIG. 12 so that terminals u, v, w are located on one side and terminals x, y, z are located on another side. Namely, as to insulation between the phases, it is necessary to ensure insulation between terminals x, y, and z and insulation between terminals u, v, and w.

In thyristor valve 202 as well, thyristor switch units 70a, 70b, 70c are mounted similarly to the first embodiment, so that TSCs 11 of two phases having the shortest phase-to-phase distance between the thyristor switches are opposite to each other in terms of the order in which thyristor switch 40 and capacitor 30 are electrically connected. In the case where TSC 11b of the b phase differs from the TSCs of the remaining two phases in terms of the order in which thyristor switch 40 and capacitor 30 are electrically connected, thyristor valve 202 may be configured so that phase-to-phase distance Dab or Dbc among phase-to-phase distances Dab, Dbc, Dca is shortest, to thereby enable an adequate phase-to-phase distance to be ensured efficiently.

For example, thyristor switch unit 70b of the b phase is arranged between thyristor switch units 70a and 70c of the a phase and the c phase having a common order in which thyristor switch 40 and capacitor 30 are electrically connected. Accordingly, TSCs 11 of the a phase and the b phase that are physically arranged adjacently to each other can be made opposite to each other and TSCs 11 of the b phase and the c phase that are physically arranged adjacently to each other can be made opposite to each other, in terms of the order in which thyristor switch 40 and capacitor 30 are electrically connected. In this way, like thyristor valve 200 of the first embodiment, the horizontal space necessary for ensuring an adequate insulation distance can be reduced.

Thus, the configuration of thyristor valve 202 according to the second example of the second embodiment can also reduce the dimensions of the thyristor valve including the insulators, like the first embodiment, and therefore, the static var compensator can be reduced in size and also in cost.

It should be noted that, in the example configuration in FIG. 12, another phase-to-phase insulation support insulator may further be arranged as required between terminals of thyristor switch units 70b and terminals of thyristor switch units 70a, 70c.

Like the first and second examples shown in FIGS. 11 and 12, as long as thyristor switch units 70a, 70b, 70c are mounted so that TSCs of two phases having a shortest phase-to-phase distance between respective thyristor switches are opposite to each other in terms of the order in which thyristor switch 40 and capacitor 30 are electrically connected, the configuration of the thyristor valve may be changed as appropriate. Thyristor switch units 70a, 70b, 70c are arranged in this way to make it possible to reduce the dimensions of the thyristor valve and thereby reduce the size and cost of the static var compensator.

It should be noted that the present embodiment illustrates by way of example the configuration in which thyristor switch 40 is connected between reactor 20 and capacitor 30 in TSC 11 of each phase. Alternatively, TSC 11 of at least one phase may also be configured so that thyristor switch 40 is connected to three-phase AC bus 5 without reactor 20 or capacitor 30 therebetween. In this case as well, the delta-connected TSCs of three phases may be configured so that the TSC of any one of the three phases is opposite to the TSCs of the remaining two phases in terms of the order in which thyristor switch 40 and capacitor 30 are electrically connected along the loop path composed of delta-connected TSCs. This may be combined with the above-described arrangement of the thyristor switches (thyristor switch units) of respective phases to enable a static var compensator having similar effects to those of the present embodiment to be configured.

Moreover, the TSC of each phase is not limited to the series circuit of the thyristor switch, the reactor, and the capacitor illustrated in connection with the present embodiment, but may also be configured to have a series circuit of the thyristor switch and the capacitor. In this case as well, the delta-connected TSCs of three phases may be configured so that the TSC of any one of the three phases is opposite to the TSCs of the remaining two phases in terms of the order in which thyristor switch 40 and capacitor 30 are electrically connected along the loop path composed of delta-connected TSCs. Namely, this may be combined with the above-described arrangement of the thyristor switches (thyristor switch units) of respective phases to enable a static var compensator having similar effects to those of the present embodiment to be configured.

Although the present invention has been described and illustrated in detail, it is clearly understood that the same is by way of illustration and example only and is not to be taken by way of limitation, the scope of the present invention being interpreted by the terms of the appended claims.

What is claimed is:
1. A static var compensator comprising
series circuits of three phases that are delta-connected to three-phase AC buses,
said series circuits each including a capacitor and a thyristor switch that are electrically connected in series, the thyristor switch having two terminals, one terminal on each side of the thyristor switch, said series circuit of one of said three phases being configured, in terms of a connection order in which said thyristor switch and said capacitor are electrically connected along a loop path made up of said delta-connected series circuits, to be an opposite order to the connection order of said series circuits of the remaining two phases, wherein said thyristor switches of the three phases form a thyristor valve in which said thyristor switches of the three phases are vertically stacked on each other, and a first thyristor switch of said thyristor switches is arranged in a physically middle position between the other remaining thyristor switches of said thyristor switches in said thyristor valve so that a terminal-to-terminal distance between said first thyristor switch and each of the other remaining thyristor switches on a same side of the respective thyristor switches is shorter than a terminal-to-terminal distance between terminals on a same side of the other remaining thyristor switches, and wherein the series circuit including said first thyristor switch is configured to be said opposite order to the connection order of each of the series circuits including the other remaining thyristor switches.

2. The static var compensator according to claim 1, wherein
the series circuits including said other remaining thyristor switches are configured to be common in said connection order.

3. The static var compensator according to claim 1, wherein
said series circuits each further include a reactor electrically connected in series to said capacitor and said thyristor switch.

4. The static var compensator according to claim 1, wherein
said series circuits each further include a reactor electrically connected in series to said capacitor and said thyristor switch, and
said thyristor switch of each phase has:
a first terminal electrically connected to one of said three-phase AC buses through one of said capacitor and said reactor; and
a second terminal electrically connected to another one of said three-phase AC buses through the other of said capacitor and said reactor.

5. A static var compensator comprising
series circuits of three phases that are delta-connected to three-phase AC buses,
said series circuits each including a capacitor and a thyristor switch that are electrically connected in series, the thyristor switch having two terminals, one terminal on each side of the thyristor switch,
said series circuit of one of said three phases being configured, in terms of a connection order in which said thyristor switch and said capacitor are electrically connected along a loop path made up of said delta-connected series circuits, to be an opposite order to the connection order of said series circuits of the remaining two phases,
wherein said thyristor switches of the three phases form a thyristor valve in which first and second thyristor switches of two phases of said three phases are vertically stacked on each other and a third thyristor switch of a remaining phase of said three phases is arranged in the form of a single stage, and said first, second, and third thyristor switches are arranged in said thyristor valve so that a terminal-to-terminal distance between said first and second thyristor switches on a same side of the respective thyristor switches is shorter than a terminal-to-terminal distance between each of said first and second thyristor switches and said third thyristor switch on a same side of the respective thyristor switches, and
wherein the series circuit including said first thyristor switch is configured to be said opposite order to the connection order of each of the series circuits including said second and third thyristor switches.

6. The static var compensator according to claim 5, wherein
the series circuits including said second and third thyristor switches are configured to be common in said connection order.

7. The static var compensator according to claim 5, wherein
said first thyristor switch is arranged in an upper stage of a stack of said first and second thyristor switches.

8. The static var compensator according to claim 5, wherein
said second thyristor switch is arranged in upper stage of a stack of said first and second thyristor switches.

9. The static var compensator according to claim 5, wherein
said series circuits each further include a reactor electrically connected in series to said capacitor and said thyristor switch.

10. The static var compensator according to claim 5, wherein
said series circuits each further include a reactor electrically connected in series to said capacitor and said thyristor switch, and
said thyristor switch of each phase has:
a first terminal electrically connected to one of said three-phase AC buses through one of said capacitor and said reactor; and
a second terminal electrically connected to another one of said three-phase AC buses through the other of said capacitor and said reactor.

11. A static var compensator comprising
series circuits of three phases that are delta-connected to three-phase AC buses,
said series circuits each including a capacitor and a thyristor switch that are electrically connected in series, the thyristor switch having two terminals, one terminal on each side of the thyristor switch,
said series circuit of one of said three phases being configured, in terms of a connection order in which said thyristor switch and said capacitor are electrically connected along a loop path made up of said delta-connected series circuits, to be an opposite order to the connection order of said series circuits of the remaining two phases,
wherein said thyristor switches of the three phases form a thyristor valve in which said thyristor switches of said three phases are horizontally arranged successively, and a first thyristor switch is arranged in a physically middle position between the other remaining thyristor switches in said thyristor valve so that a terminal-to-terminal distance between said first thyristor switch and each of the other remaining thyristor switches on a same side of the respective thyristor switches is shorter than a terminal-to-terminal distance between the other remaining thyristor switches on a same side of the respective thyristor switches, and wherein the series circuit including said first thyristor switch is configured to be said opposite order to the connection order of each of the series circuits including the other remaining thyristor switches.

12. The static var compensator according to claim 11, wherein
the series circuits including said other remaining thyristor switches are configured to be common in said connection order.

13. The static var compensator according to claim 11, wherein
said series circuits each further include a reactor electrically connected in series to said capacitor and said thyristor switch.

14. The static var compensator according to claim 11, wherein
said series circuits each further include a reactor electrically connected in series to said capacitor and said thyristor switch, and
said thyristor switch of each phase has:
   a first terminal electrically connected to one of said three-phase AC buses through one of said capacitor and said reactor; and
   a second terminal electrically connected to another one of said three-phase AC buses through the other of said capacitor and said reactor.

* * * * *